United States Patent [19]
Shin et al.

[11] Patent Number: 4,947,396
[45] Date of Patent: Aug. 7, 1990

[54] METHOD AND SYSTEM FOR DETECTING DATA ERROR

[75] Inventors: Kimitoshi Shin, Akishima; Yukiko Okumura, Mitaka, both of Japan

[73] Assignee: Kabushiki Kaisha Toshiba, Kawasaki, Japan

[21] Appl. No.: 285,934

[22] Filed: Dec. 19, 1988

[30] Foreign Application Priority Data

Mar. 7, 1988 [JP] Japan .................................. 63-53095

[51] Int. Cl.⁵ ............................................. G06F 11/10
[52] U.S. Cl. ...................................... 371/40.1; 371/54
[58] Field of Search ...................... 371/54, 37.1, 37.2, 371/37.4, 37.5, 37.6, 37.3, 37.8, 37.9, 40.1, 40.2, 40.3, 40.4, 53

[56] References Cited

U.S. PATENT DOCUMENTS

| | | | |
|---|---|---|---|
| 3,996,558 | 12/1976 | Heun | 371/54 |
| 4,328,746 | 5/1982 | Eglowstein | 371/54 |
| 4,796,222 | 1/1989 | Aichelmann | 371/40.1 |
| 4,802,170 | 1/1989 | Trottier | 371/40.4 |
| 4,802,173 | 1/1989 | Baygen | 371/40.4 |

Primary Examiner—Michael R. Fleming
Attorney, Agent, or Firm—Finnegan, Henderson, Farabow, Garrett, and Dunner

[57] ABSTRACT

A data error detecting method and system which can detect whether or not there occured an error in data stored in a memory of a computer system or the like. A new error check sign is introduced in addition to a prior art check sum sign to detect the data error on the basis of the both signs. The new error check sign is generated by applying weights that are different for different addresses in each of data blocks to the associated numbers of "1's" or "0's" of data stored at the addresses, multiplying the values of the addresses to the associated weighted numbers of "1's" or "0's" and then adding the multiplication results together.

17 Claims, 8 Drawing Sheets

METHOD AND SYSTEM FOR DETECTING DATA ERROR

BACKGROUND OF THE INVENTION

1. Field of the Invention

The present invention relates to a method and apparatus for detecting a data error which can reliably detect whether or not an error took place in a data-stored in a memory of a computer system or the like.

2. Description of the Related Art

An example of computer systems is an on-line system which is shown in FIG. 4. In the drawing, the on-line system comprises a host computer 1 and a terminal unit 7 which are connected by a signal cable 6 to each other. More specifically, the signal cable 6 connects communication controllers 5 and 8 respectively included in the host computer 1 and the terminal unit 7. The host computer 1 includes a data base 3, a memory 4, the aforementioned communication controller 5, and a central processing unit (CPU) 2 which is connected to these constituent parts 3, 4 and 5 to control these parts. The terminal unit 7, on the other hand, includes the aforementioned communication controller 8, a ROM 10, a RAM 11 protected by a battery 12 (which battery may be omitted in some applications), a keyboard input unit 13, a display unit 14, and a central processing unit (CPU) 9 which is connected to these parts 8, 10, 11, 13 and 14 to control the parts.

Referring to FIG. 5, there is shown a storage region of a memory 100 which comprises the ROM 10 and the RAM 11 in the terminal unit 7. In the drawing, the storage region comprises an IPL program zone 103, a terminal program load zone 104, a terminal control program load zone 105, a working area 106 and a check sign area 107.

The operation of such a terminal unit 7 will be explained in accordance with a flowchart shown in FIG. 6. First, when the power supply is turned ON or the CPU 9 is reset, the terminal unit 7 is energized (step 201). This causes the program of the IPL program zone 103 to be initiated so that the CPU 9 starts its operation (step 202). And the CPU 9 generates a check sum sign for the data of the terminal program load zone 104 and compares it with the corresponding check sum sign already stored in the check area 107 to detect a coincidence or noncoincidence therebetween (step 204). The CPU 9, when detecting a coincidence at the step 204, causes a signal indicative of unnecesary loading of any program to be sent to the host computer 1 (step 205) and starts its terminal control (step 211). On the other hand, the CPU 9, when detecting a non-coincidence at the step 204, causes a signal indicative of necessary loading of a program to be sent to the host computer 1 [step 206), and starts its program loading processing. -And the CpU 9 receives through the communication controller 8 signals transmitted from the host computer 1 (step 207) until it receives an end signal and it continues to store the data into the program load zone 104 of the RAM 11 (steps 208 and 209). When detecting the end signal, the CPU 9 generates a check sum signal for the data stored in the program load zone 104, stores it into the check sign area 107 (step 210), and starts its terminal control operation (step 211).

Now explanation will be made as to how to generate the check sum sign by referring to FIG. 7. It is now assumed that one of the blocks have addresses from a to (b − 1) and capable of storing data $\omega_a, \omega_{a+1}, \ldots,$ and $\omega_{b-1}$, respectively. In this case, the check sum sign corresponds to the lowest one byte of a sum $\omega$ of $\omega_a, \omega_{a+1}, \ldots,$ and $\omega_{b-1}$. Check sum signs are sequentially obtained and stored through such a procedure as mentioned above so that a new check sum sign obtained at a predetermined time through the above procedure can be compared with the corresponding check sum sign previously held for error check.

Such check sum sign, which can be easily generated in a short time, has been widely used to positively detect a one-bit error.

However, in the event where 2-bit error takes place as shown in FIG. 8, the check sum sign method cannot detect the 2-bit error any longer. More in Detail, this method is defective in that, in the case where a bit 2 at an address (a+i) changes from "1" to "0" and a bit 2 at an address (a+j) changes from "0" to "1"; $\omega_a, \omega_{a+1}, \ldots, \omega_{a+i}-2^2, \omega_{a+j}+2^2, \ldots, \omega_{-1}$ are added together in order to generate a check sum sign, but its sum becomes X that is exactly the same as the sum X at the normal time, thus making it impossible to detect the error.

As has been mentioned above, the prior art method for detecting an error in data stored in a memory has had such a problem that, since the prior art method is based on the aforementioned one-bit check sum sign alone, it cannot detect a 2-bit error though it can detect a one-bit error.

The present invention has been made to solve the above problem in the prior art data error detecting method, and an object of the invention is to provide a method and system for detecting a data error which can reliably detect a 2-bit error in addition to a one-bit error.

SUMMARY OF THE INVENTION

In accordance with the present invention, a new error check sign is introduced in addition to the aforementioned prior art check sum sign to detect a data error on the basis of both of the aforementioned and new error check signs. The new error check sign is generated by applying weights that are different for different addresses to the associated numbers of "1's" or "0's" of the data stored in the respective addresses and, for example, by multiplying the weighted values of such addresses by the associated numbers of "1's" or "0's" and then adding together such multiplied values.

That is, in accordance with the present invention, there is provided a method for detecting a data error, which method comprises a first step of calculating a first error detection sign (check sum sign) for each of the first blocks through execution of a first calculation of dividing a data storage region of a memory into a plurality of first blocks and adding together data store at respective addresses of each of the first blocks, and holding the calculated first error check signs; a second step of calculating a second error sign (new error check sign) for each of the second blocks through execution of a second calculation of dividing the data storage region of the memory into a plurality of second blocks, applying weights that are different for different addresses to the associated numbers of "1's" or "0's" of data stored at the addresses in each of the second blocks, multiplying values of the addresses by the associated weighted numbers of "1's" or "0's" and adding together the multiplication results for each of the second blocks, and holding the calculated second error check signs; and a third step of executing the first and second calculations at a predetermined time to obtain new first and second error check signs, and executing detection of the data error through comparison of the new first error check sign with the corresponding first error check sign previously held and through comparison of the new second error check sign with the corresponding second error check sign previously held.

With such an arrangement as mentioned above, even when the same error as in FIG. 8 takes place at the same addresses in the data stored in the program load zone 104 as shown in FIG. 3, the error can be detected. In FIG. 3, an address (a+255) is shown in place of the address (b−1) in FIG. 8 for the brevity of explanation. In other words, an error check sign is generated for every data having 256 addresses.

In the normal condition, the following relationship is satisfied.

$$\begin{array}{l} a \times \text{(number of "1's")} \\ (a+i) \times \text{(number of "1's")} \\ (a+j) \times \text{(number of "1's")} \\ \underline{+)(a+255) \times \text{(number of "1's")}} \\ \hspace{2cm} Y \end{array}$$

If such an error as shown in FIG. 3 takes place, then the following relationship is met.

$$\begin{array}{l} a \times \text{(number of "1's")} \\ (a+i) \times \text{(number of "1's" at the normal time minus 1)} \\ (a+j) \times \text{(number of "1's" at the normal time plus 1)} \\ \underline{+)(a+55) \times \text{(number of "1's")}} \\ \hspace{1cm} Y - (a+i) + (a+j) = \\ \hspace{2cm} Y - i + j \end{array}$$

Since $i \neq j$ (MOD 256) in the illustrated example, the 2-bit error can be eected. In addition, the present invention performs error check on the basis of a check sum sign together with the error check based on the aforementioned error check sign, whereby both the error checks can become complementary to each other and therefore such 2-bit error detection, which has been impossible so far, can be achieved.

DESCRIPTION OF THE PREFERRED EMBODIMENT

Figure 1:
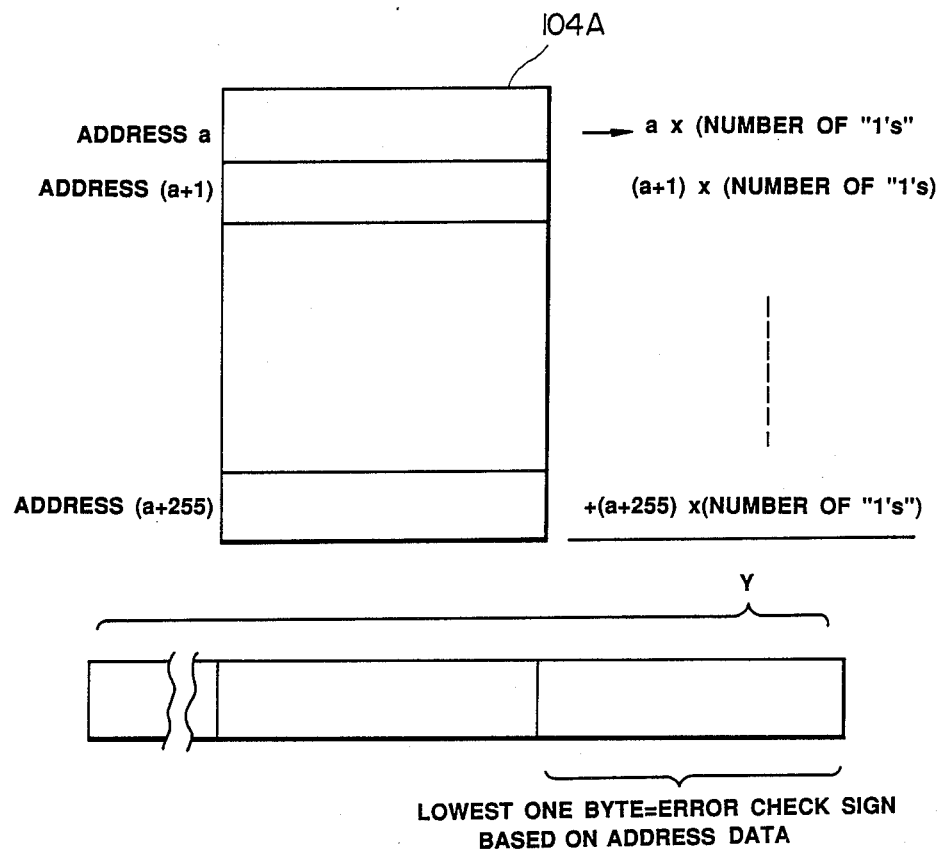
FIG. 1 is a diagram for explaining an embodiment of the present invention.
Figure 2:
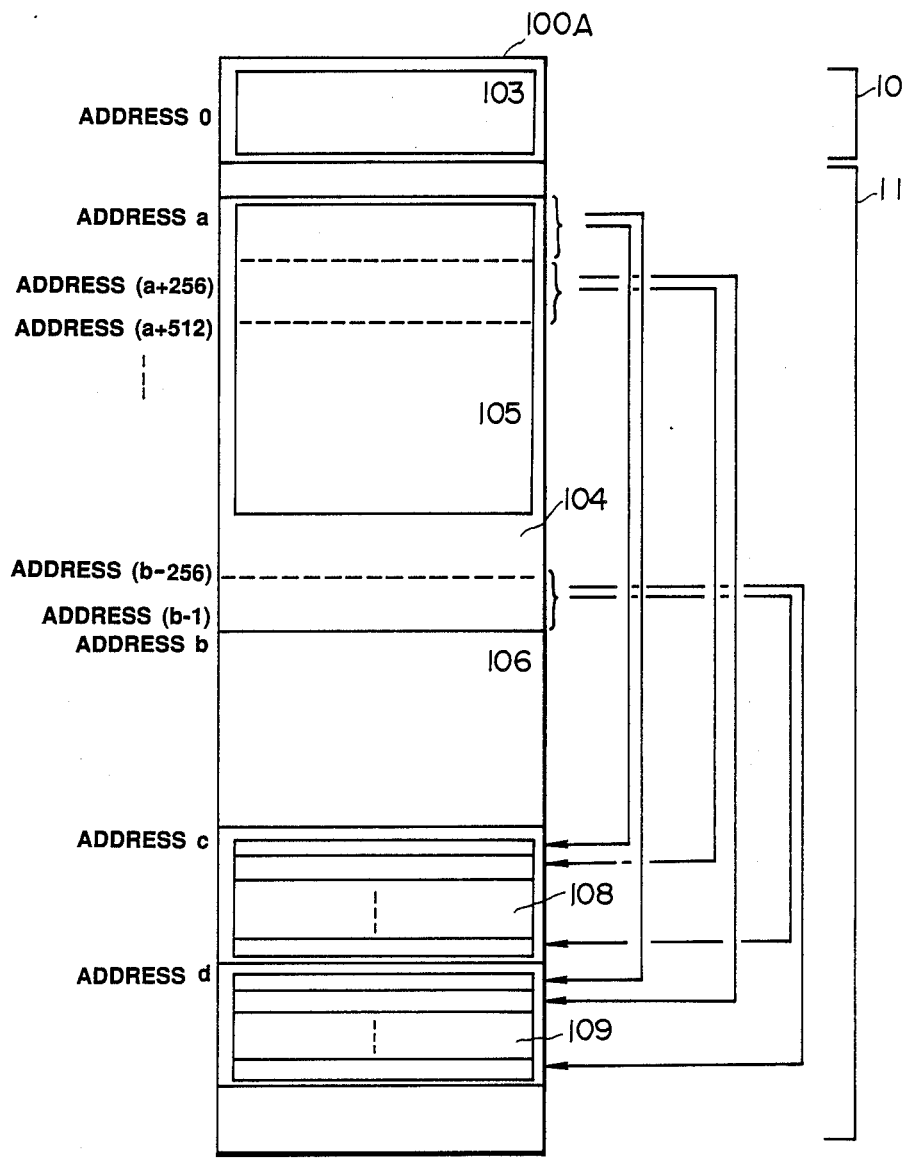
FIG. 2 is a block diagram of a storage zone of a memory used in a system to which the embodiment of the present invention is applied.
Figure 4:
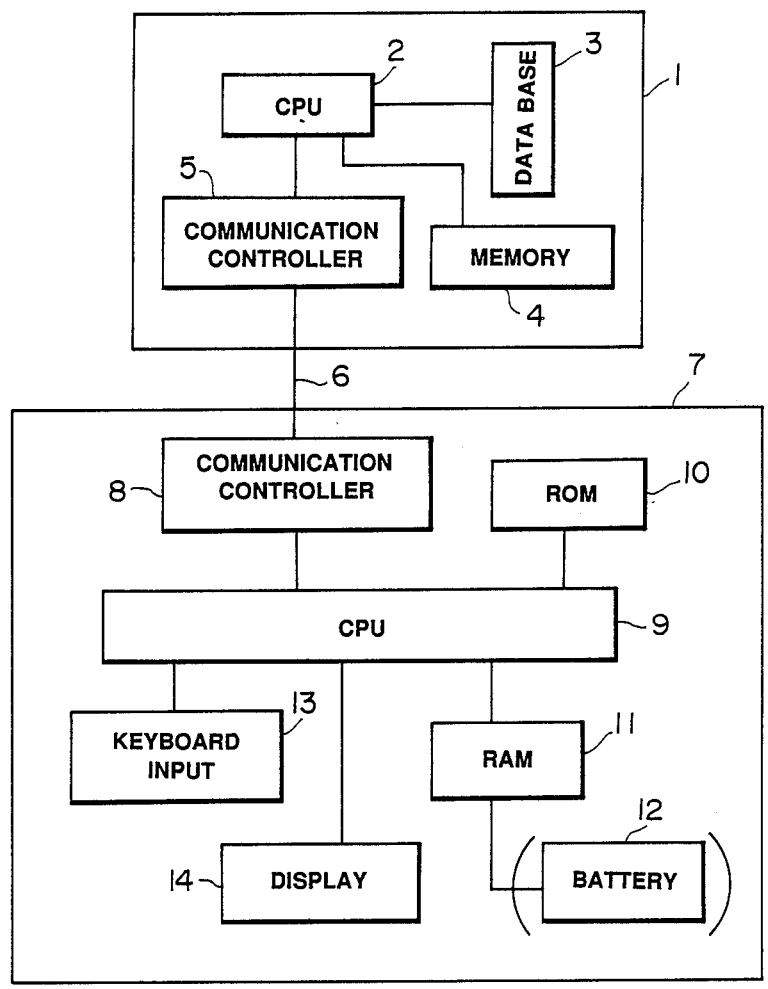
FIG. 4 is a block diagram of an on-line system.
Figure 5:
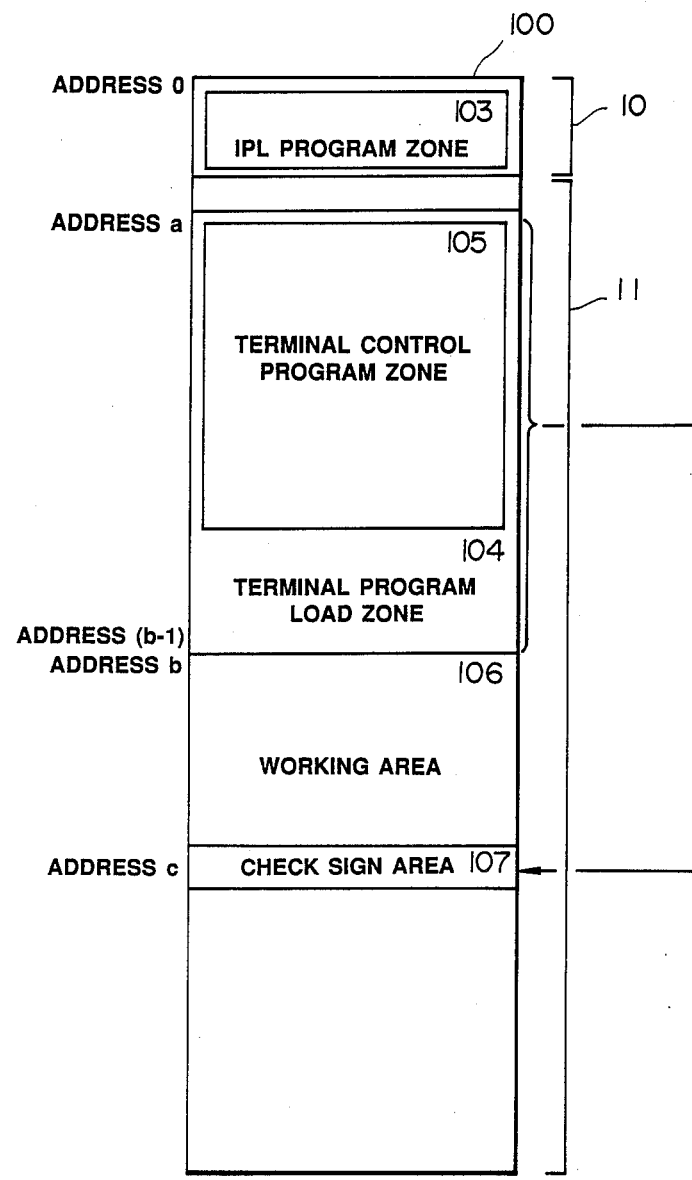
FIG. 5 is a block diagram of a storage region of a memory used in a system to which a prior art method for detecting a data error is applied.
Figure 6:
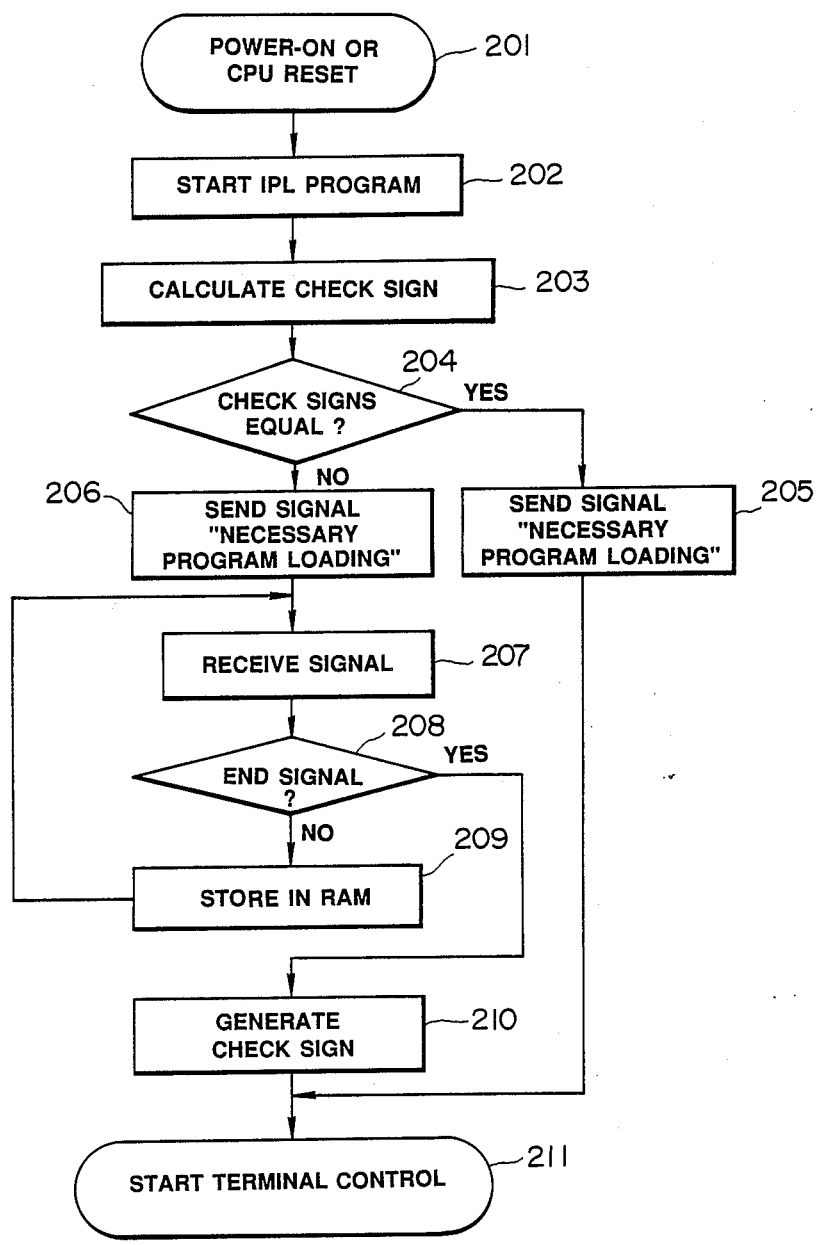
FIG. 6 is a flowchart for explaining the operation of a major part of the on-line system shown in FIG. 4.
Figure 7:
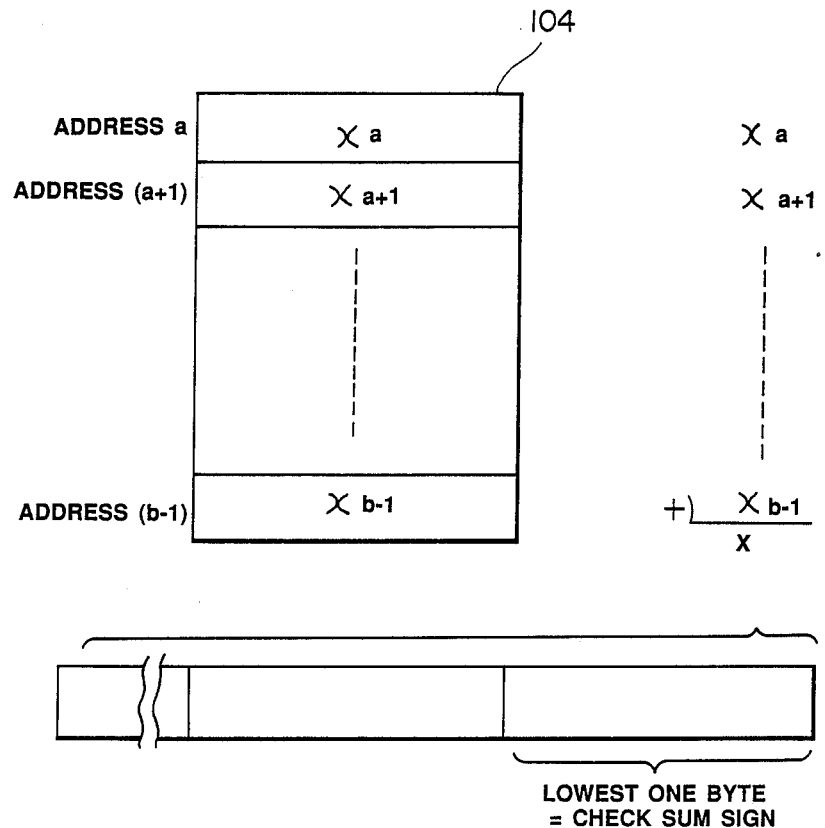
FIG. 7 is a diagram for explaining how to generate a prior art check sum sign.
Figure 8:
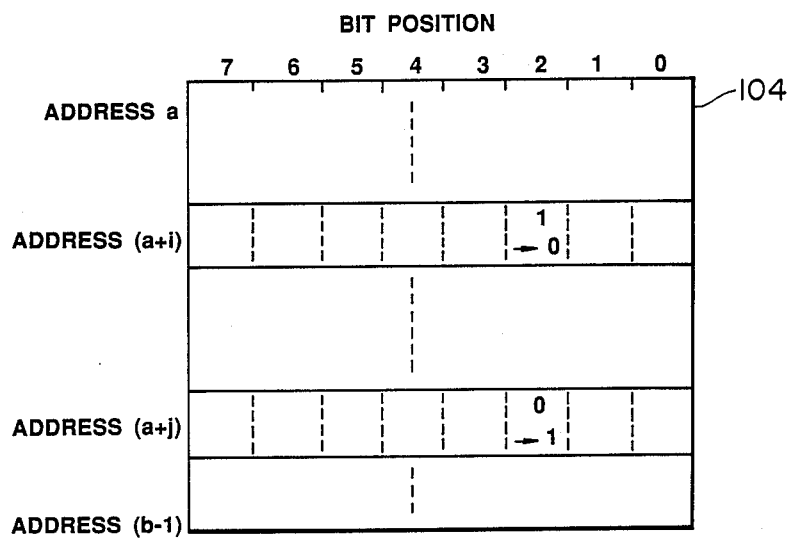
FIG. 8 is a diagram for explaining the prior art data error detecting method.

An embodiment of the present invention will be explained with reference to the attached drawings. The present embodiment is applied to such an on-line system as shown in FIG. 4, in which the terminal unit 7 that executes such a program as shown by a flowchart in FIG. 6. And a storage region 100A of a memory in the terminal unit 7 as shown in FIG. 2 is basically the same as that of the prior art shown in FIG. 5, except that the check sign area 107 in FIG. 5 is divided into a check sum sign area 108 and an error check sign area 109 based on address data in FIG. 2. In the present embodiment, the check sum sign is previously prepared in the same manner as already explained in connection with FIG. 7 and already stored in the check sum sign area 108. Under such a condition, the CPU 9 generates an error check sign in such a manner as illustrated in FIG. 1 at the step 203 or 210 of the flowchart of FIG. 6. In the illustrated embodiment, in order to obtain a 1-byte error check sign, the program load zone 104 is divided into blocks each having 256 addresses. Shown in FIG. 1 are addresses from a to (a+255) and an error check sign is generated in the unit of 256 addresses. More specifically, the CPU 9 detects the number of "1's" of the data included in each of the addresses, multiplies the "1" numbers detected for the respective addresses by the associated addresses, and addes together these multiplication results to obtain a sum Y. The lowest byte of the sum Y is used as an error check sign. The error check signs thus obtained for all the blocks are sequentially stored in an error check sign area 109. A new check sum sign is prepared for the each block at a predetermined time in the similar manner as explained in connection with FIG. 7, and is compared with the corresponding check sum sign previously stored in a check sum sign area 108 for error check. Furthermore, a new error check sign is prepared in accordance with the aforementioned technique for preparing the error check sign to detect a data error.

Explanation will next be made as to the case where data error detection is effected based on both the check sum sign and the error check sign, by referring to FIG. 3. The normal condition, the sum Y can be obtained as follows.

$$\begin{array}{l} a \times \text{(number of "1's")} \\ (a+i) \times \text{(number of "1's")} \\ (a+j) \times \text{(number of "1's")} \\ \underline{+)(a+255) \times \text{(number of "1's")}} \\ \hspace{2cm} Y \end{array}$$

Figure 3:
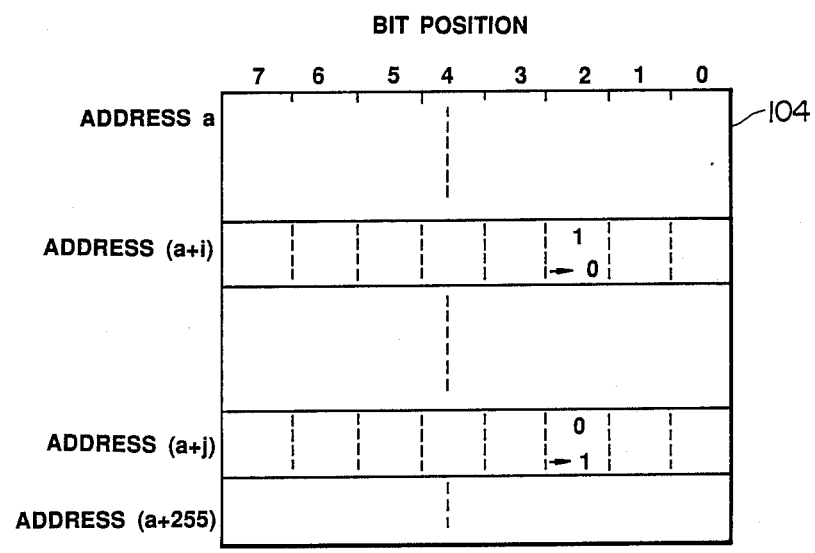
FIG. 3 is a diagram for explaining a method for detecting a data error in accordance with the present embodiment.

When there occurs such an error that a bit 2 located at an address (a+i) changes from "1" to "0" and a bit 2 located at an address (a+j) changes from "0" to "1" as shown in FIG. 3, on the other hand, the sum is calculated as follows.

$$\begin{array}{l} a \times \text{(number of "1's")} \\ (a+i) \times \text{(number of "1's" at the normal time minus 1)} \\ (a+j) \times \text{(number of "1's" at the normal time plus 1)} \\ \underline{+)(a+55) \times \text{(number of "1's")}} \\ \hspace{1cm} Y - (a+i) + (a+j) = \\ \hspace{2cm} Y - i + j \end{array}$$

Since $i \neq j$ (MOD 256), a 2-bit error can be detected. Although the number of "1's" in the data has been used for error detection in the present embodiment, the number of "0's" in the data may be employed In addition, the lowest one byte of the calculation result has been employed to generate the error detecting sign, but the error detecting sign may comprises more or less than 1 byte. In this connection, the 2-bit error detection is enabled where a bock size does not exceed the address size denoted by the number of bits of the error detecting sign.

The foregoing embodiment has been arranged so that the values of the addresses have been multiplied by the associated numbers of "1's" or "0'" in the data stored at the respective addresses, but the address values may similarly be replaced by values other than the address values. Further, a 2-bit error can be detected so long as the values to be multiplied are different for different addresses.

Moreover, the blocks for the generation of the check sum sign have been arranged in the foregoing to be the same as those for the generation of the error check sign introduced in the present invention, but these blocks may not be necessarily the same.

What is claimed is:

1. A method for detecting a data error, comprising;
   a first step of calculating a first error detection sign for each of said first blocks through execution of a first calculation of dividing a data storage region of a memory into a plurality of first blocks and adding together data stored at respective addresses of each of the first blocks, and holding said calculated first error check sign;
   a second step of calculating a second error sign for each of said second blocks through execution of a second calculation of dividing the data storage region of said memory into a plurality of second blocks, applying weights that are different for different addresses to the associated numbers of "1's" or "0's" of data stored at the addresses in each of the second blocks and adding together the results for each of the second blocks, and holding the calculated second error check sign; and
   a third step of executing said first and second calculations at a predetermined time to obtain new first and second error check signs, and executing detection of the data error through comparison of said new first error check sign with the corresponding first error check sign previously held and through comparison of said new second error check sign with the corresponding second error check sign previously held.

2. A method for detecting a data error as set forth in claim 1, wherein said first step includes employing as said first error detecting sign a necessary digit or digits of a value obtained through said first calcuation.

3. A method for detecting a data error as set forth in claim 2, wherein a length of said first block is determined depending on the number of digits of said first error check sign.

4. A method for detecting a data error as set forth in claim 1, wherein a length of said first block is set to be equal to the length of said second bock.

5. A method for detecting a data error as set forth in claim 1, wherein said second step includes calculating said second error sign through the execution of said second calculation of multiplying the values of the addresses in each of said second blocks by the associated numbers of "1's" or "0's" of the data stored at the respective addresses of the second block and adding together the multiplication results for each of the second blocks.

6. A method for detecting a data error as set forth in claim 1, wherein said second step includes employing as said first error detecting sign a necessary digit or digits of a value obtained through said second calcuation.

7. A method for detecting a data error as set forth in claim 6, wherein a length of said second block is determined depending on the number of digits of said second error check sign.

8. A method for detecting a data error as set forth in claim 1, wherein said third step includes, when finding a non-coincidence in at least one of said comparison between said new first error check sign and corresponding said first error check sign previously stored and said comparison between the new second error check sign and corresponding said second error check sign previously stored, detecting it as a data error.

9. A method for detecting a data error, comprising;
   a first step of dividing 2-valued data stored at addresses of a memory into a plurality of blocks whose number is determined depending on the number of digits of an error check sign to be prepared, adding together these data in each of said blocks, and holding a necessary digit or digits of the added value as a check sum sign;
   a second step of multiplying the numbers of "1's" or "0's" of the 2-valued data stored at said respective addresses in each of the blocks by the associated number of the addresses, adding together these multiplication result in each of the blocks, and holding a necessary digit or digits of said addition result as an error check sign; and
   a third step of detecting said data error by carrying out the same calculation as the above at a predetermined time to generate a new check sum sign and a new error check sign, comparing said new check sum sign with corresponding said check sum sign previously held, and comparing said new error check sign with corresponding said error check sign previously held.

10. A method for detecting a data error as set forth in claim 9, wherein the number of addresses included in said block is set to be smaller than $2^n$, where n represents the number of digits of said error check sign.

11. A system of detecting a data error, comprising:
    first calculation means for calculating a first error detection sign through execution of a first calculation of dividing a data storage region of a memory into a plurality of first blocks and of adding together data stored at respective addresses in each of said first blocks;
    second calculation means for calculating a second error detection sign through execution of a second calculation of dividing the data storage region of said memory into a plurality of second blocks, of applying weights that are different for different addresses in each of said second blocks to the number of "1's" or "0's" of data stored at the respective addresses of the eaoh second block, and of adding together the results for each of the second blocks;
    first storage means for storing said first error detection sign previously calculated at said first calculation means;
    second storage means for storing said second error detection previously calculated at said second calculation means;
    first comparison means for comparing a new first error detection sign calculated at said first calculation means with said first error detection sign previously stored at said first storage means;
    second comparison means for comparing a new second error detection sign calculated at said second calculation means with said second error detection sign previously stored at said second storage means; and error detection means for, when finding a non-coincidence in at least one of said comparison between said new first error detection sign and corresponding said first error detection sign previously stored and said comparison between the new second error detection sign and corresponding said second error detection sign previously stored, detecting it as a data error.

12. A system of detecting a data error as set forth o in claim 11, wherein said first calculation means uses as said first error detection sign a necessary digit or digits of value obtained through said first calculation.

13. A system for detecting a data error as set forth in claim 12, wherein a length of said first block is determined depending on the number of digits of said first error detection sign.

14. A system for detecting a data error as set forth in claim 11, wherein a length of said first block is set to be equal to a length of said second block.

15. A system for detecting-a data error as set forth in claim 11, wherein said second calculation step calculates said second error detection sign through the execution of said second calculation of multiplying the values of the addresses in each of said second blocks by the associated numbers of "1's" or "0's" of the data stored at the respective addresses of the second block and adding together the multiplication results for each of the second blocks.

16. A system for detecting a data error as set forth in claim 11, wherein said second calculation step employs as said first error detection sign a necessary digit or digits of a value obtained through said second calcuation.

17. A system for detecting a data error as set forth in claim 16, wherein a length of said second block is determined depending on the number of digits of said second error detection sign.

* * * * *